(12) United States Patent
Stoller et al.

(10) Patent No.: US 12,520,743 B2
(45) Date of Patent: Jan. 13, 2026

(54) SEED INJECTOR

(71) Applicant: Precision Planting LLC, Tremont, IL (US)

(72) Inventors: Jason Stoller, Eureka, IL (US); Todd Swanson, Morton, IL (US); Jeremy Hodel, Morton, IL (US); Kent Levy, Morton, IL (US); Ian Radtke, Washington, IL (US)

(73) Assignee: Precision Planting LLC, Tremont, IL (US)

( * ) Notice: Subject to any disclaimer, the term of this patent is extended or adjusted under 35 U.S.C. 154(b) by 110 days.

(21) Appl. No.: 18/486,490

(22) Filed: Oct. 13, 2023

(65) Prior Publication Data

US 2024/0057510 A1 Feb. 22, 2024

Related U.S. Application Data

(62) Division of application No. 16/629,886, filed as application No. PCT/US2018/041371 on Jul. 10, 2018, now Pat. No. 11,917,937.

(60) Provisional application No. 62/530,754, filed on Jul. 10, 2017.

(51) Int. Cl.
| | |
|---|---|
| *A01C 7/00* | (2006.01) |
| *A01C 5/04* | (2006.01) |
| *A01C 7/04* | (2006.01) |
| *A01C 7/06* | (2006.01) |
| *A01C 7/20* | (2006.01) |

(52) U.S. Cl.
CPC ............ *A01C 7/002* (2013.01); *A01C 5/04* (2013.01); *A01C 7/04* (2013.01); *A01C 7/06* (2013.01); *A01C 7/20* (2013.01)

(58) Field of Classification Search
CPC .. A01C 7/002; A01C 7/04; A01C 7/06; A01C 7/20; A01C 5/04; A01C 23/026; A01B 45/023
See application file for complete search history.

(56) References Cited

U.S. PATENT DOCUMENTS

| | | | | |
|---|---|---|---|---|
| 2,776,634 | A * | 1/1957 | Morton | A01G 29/00 |
| | | | | 99/345 |
| 3,394,667 | A * | 7/1968 | Lasch | A01C 7/18 |
| | | | | 111/128 |
| 3,414,063 | A * | 12/1968 | Kuhlman | A01B 45/023 |
| | | | | 172/21 |
| 4,034,686 | A * | 7/1977 | Collins | A01C 23/026 |
| | | | | 411/128 |
| 4,061,094 | A * | 12/1977 | Cary | A01C 7/002 |
| | | | | 221/212 |
| 4,178,860 | A * | 12/1979 | Hines | A01C 23/026 |
| | | | | 222/638 |
| 4,444,130 | A * | 4/1984 | Ray | A01C 5/045 |
| | | | | 111/926 |
| 4,565,141 | A * | 1/1986 | Kopecky | A01C 21/002 |
| | | | | 111/152 |
| 4,606,411 | A * | 8/1986 | Classen | A01B 45/023 |
| | | | | 172/88 |

(Continued)

*Primary Examiner* — Jamie L Mcgowan

(57) ABSTRACT

A seed unit for placing seeds into soil includes a seed meter for singulating seeds, a shaft to deliver the seeds into soil during operation, and an actuator coupled to the shaft. The actuator moves the shaft during operation and the shaft delivers seeds into the soil without a continuous seed trench.

6 Claims, 11 Drawing Sheets

(56) References Cited

U.S. PATENT DOCUMENTS

| | | | | |
|---|---|---|---|---|
| 4,637,328 A * | 1/1987 | Topham | A01C 21/002 | 221/265 |
| 4,658,909 A * | 4/1987 | McDermott | A01B 45/023 | 172/95 |
| 4,884,637 A * | 12/1989 | Rohleder | A01B 45/023 | 172/125 |
| 4,919,060 A * | 4/1990 | Cady | A01C 23/026 | 111/91 |
| 5,107,895 A * | 4/1992 | Pattison | A01C 23/026 | 111/128 |
| 5,156,102 A * | 10/1992 | Andersen | A01C 7/081 | 111/178 |
| 5,469,922 A * | 11/1995 | Bjorge | A01B 45/02 | 172/123 |
| 5,769,169 A * | 6/1998 | Miksitz | A01B 29/06 | 111/128 |
| 5,988,290 A * | 11/1999 | Banks | A01B 45/023 | 172/101 |
| 6,041,869 A * | 3/2000 | Lewis | A01B 45/023 | 172/101 |
| 6,431,096 B1 * | 8/2002 | Engelke | A01C 23/028 | 222/61 |
| 6,561,282 B2 * | 5/2003 | Smith | A01B 45/023 | 172/101 |
| 7,096,969 B2 * | 8/2006 | Petersen | A01B 45/023 | 172/123 |
| 7,198,114 B2 * | 4/2007 | Simon | A01B 45/02 | 172/22 |
| 7,267,181 B2 * | 9/2007 | Banks | A01B 45/023 | 172/21 |
| 8,255,126 B2 * | 8/2012 | Hunt | A01B 45/023 | 701/50 |
| 8,291,992 B2 * | 10/2012 | de Bree | A01B 45/023 | 172/94 |
| 10,206,321 B2 * | 2/2019 | Georgoulias | A01B 45/023 | |
| 10,791,663 B2 * | 10/2020 | Hardman | A01C 23/026 | |
| 10,798,862 B2 * | 10/2020 | Hardman | A01B 45/02 | |
| 11,166,405 B1 * | 11/2021 | Rogers | A01C 5/02 | |
| 11,818,977 B2 * | 11/2023 | Anderson | A01C 5/04 | |
| 2002/0056554 A1 * | 5/2002 | Hargreaves | A01B 45/023 | 172/21 |
| 2007/0193482 A1 * | 8/2007 | Spooner | A01C 5/04 | 111/178 |
| 2011/0213530 A1 * | 9/2011 | Hunt | A01B 45/023 | 701/50 |
| 2013/0255976 A1 * | 10/2013 | Georgoulias | A01B 45/023 | 172/2 |
| 2016/0073575 A1 * | 3/2016 | Spapperi | A01C 7/002 | 111/91 |
| 2019/0230845 A1 * | 8/2019 | Buchner | A01B 79/005 | |
| 2021/0161062 A1 * | 6/2021 | Bassett | A01C 5/04 | |

* cited by examiner

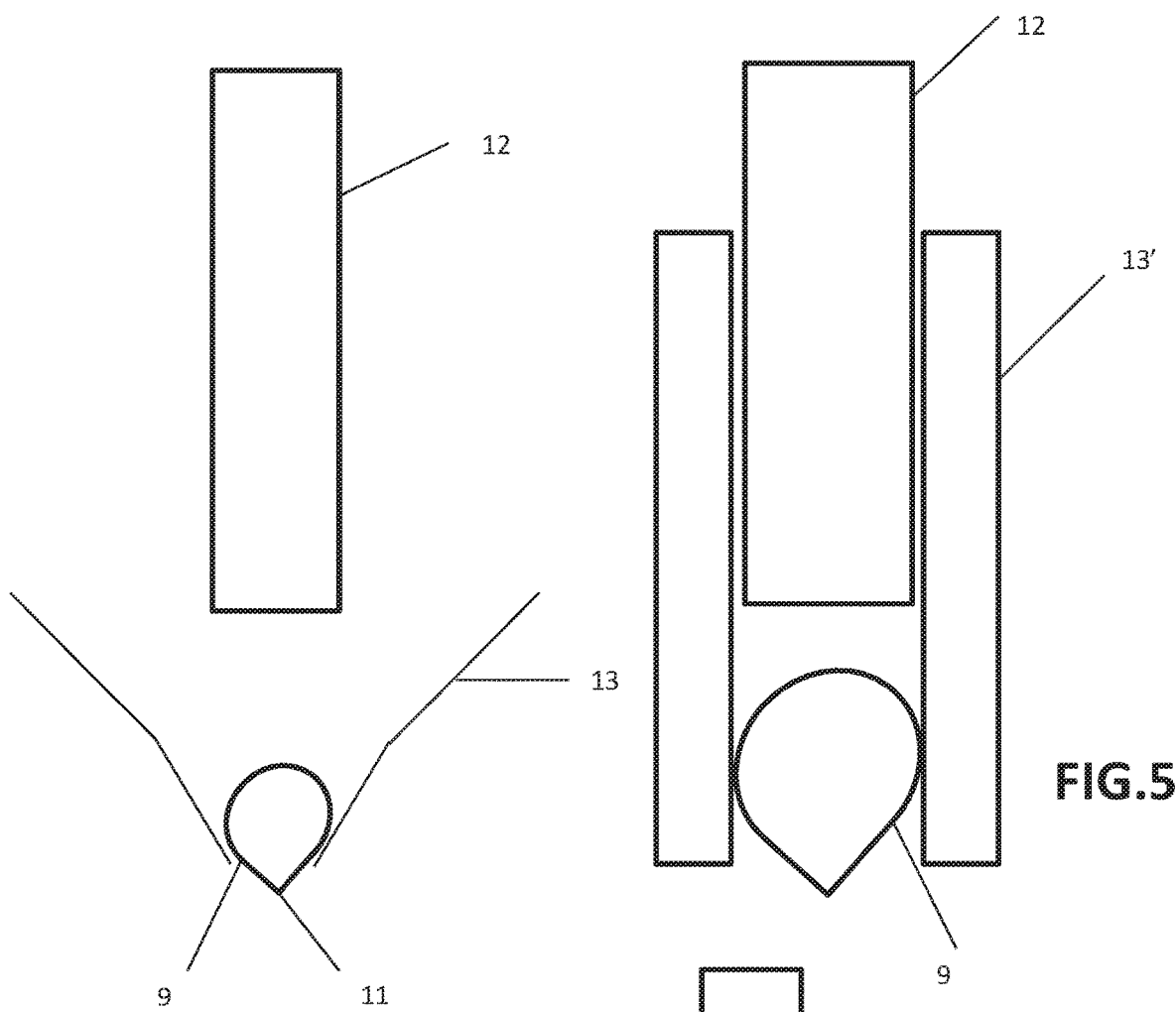
FIG. 4
FIG. 5
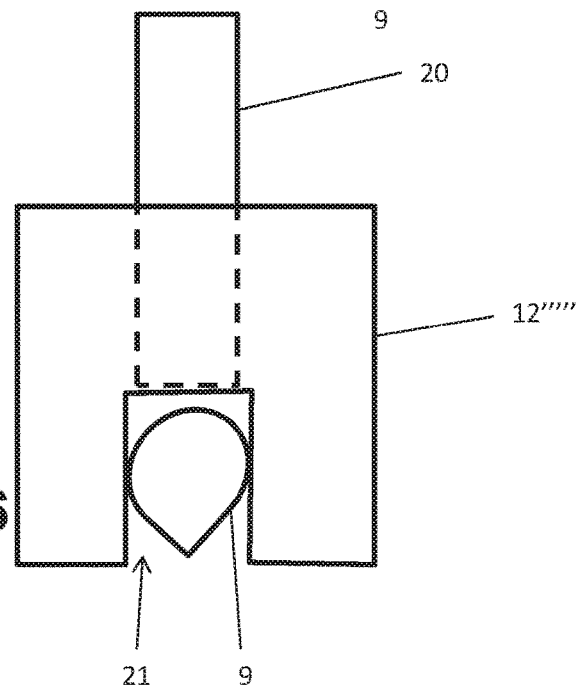
FIG. 6

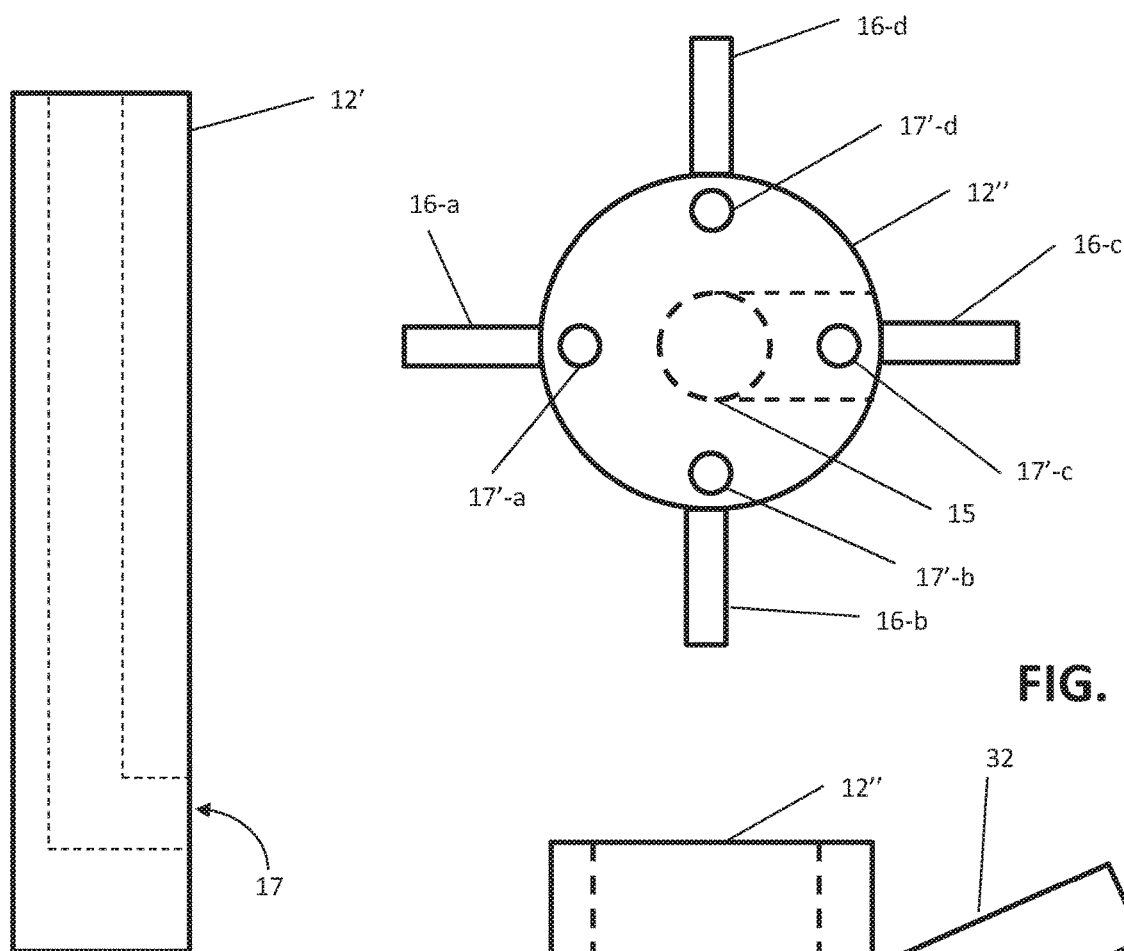
FIG. 7
FIG. 8A
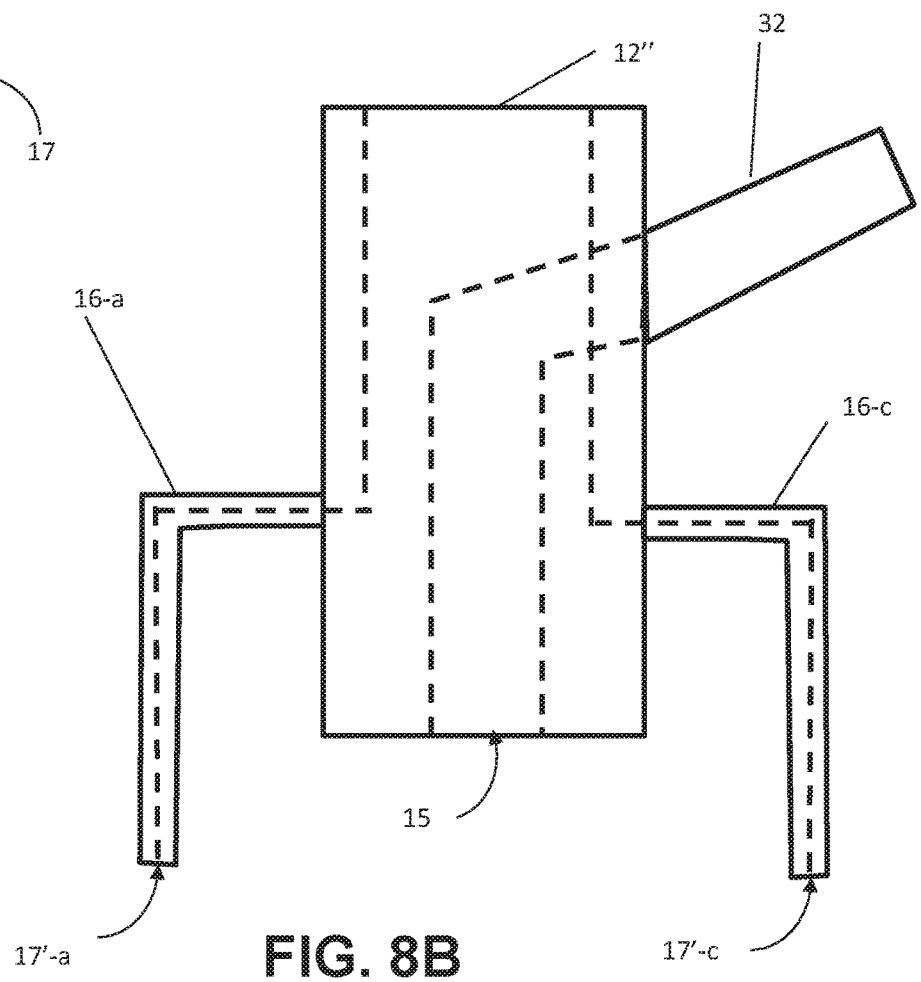
FIG. 8B

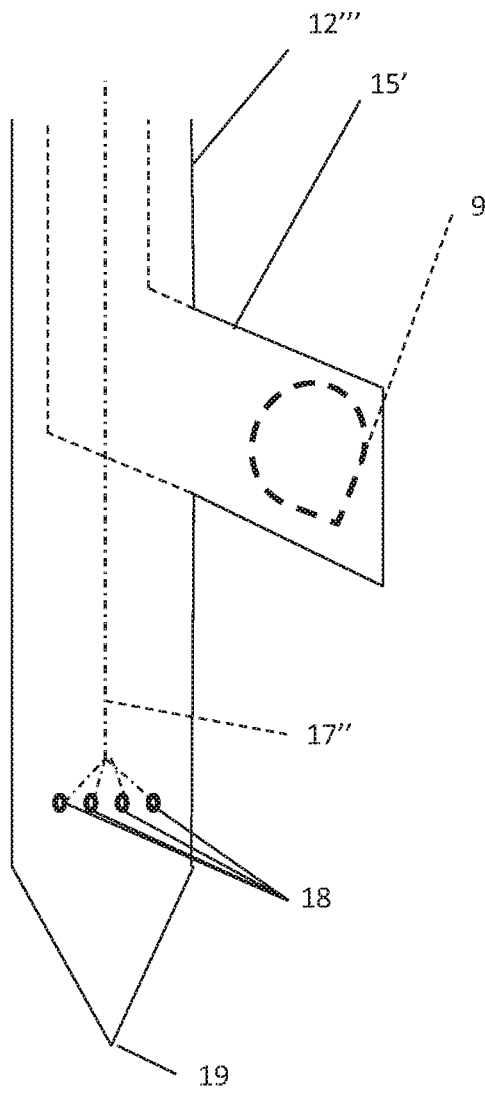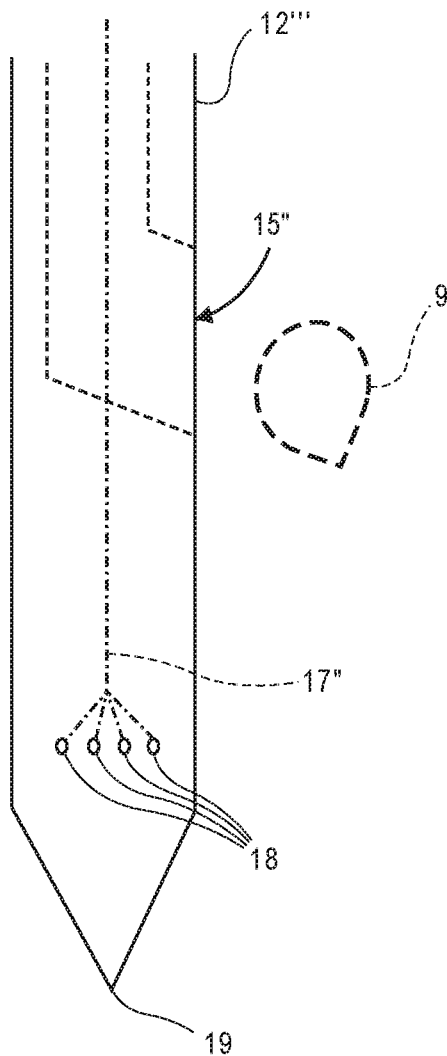
FIG. 9A
FIG. 9B

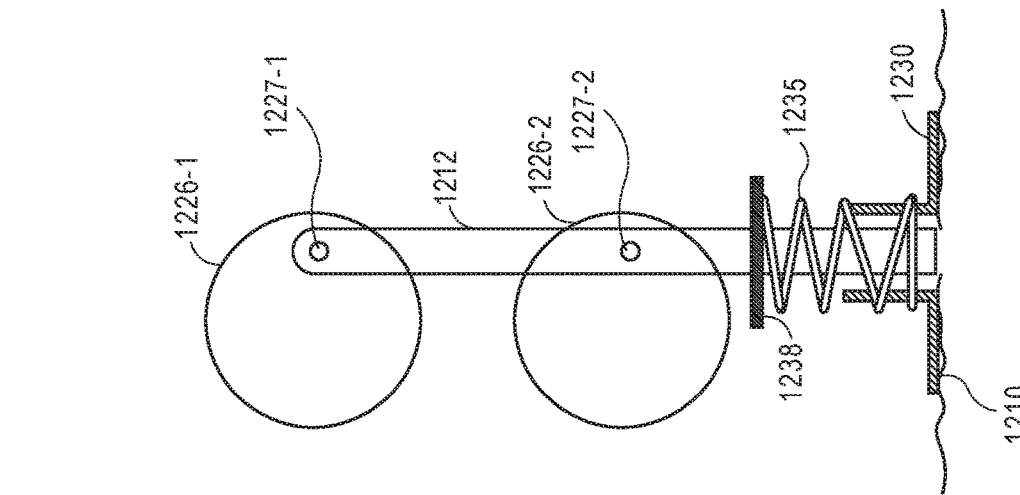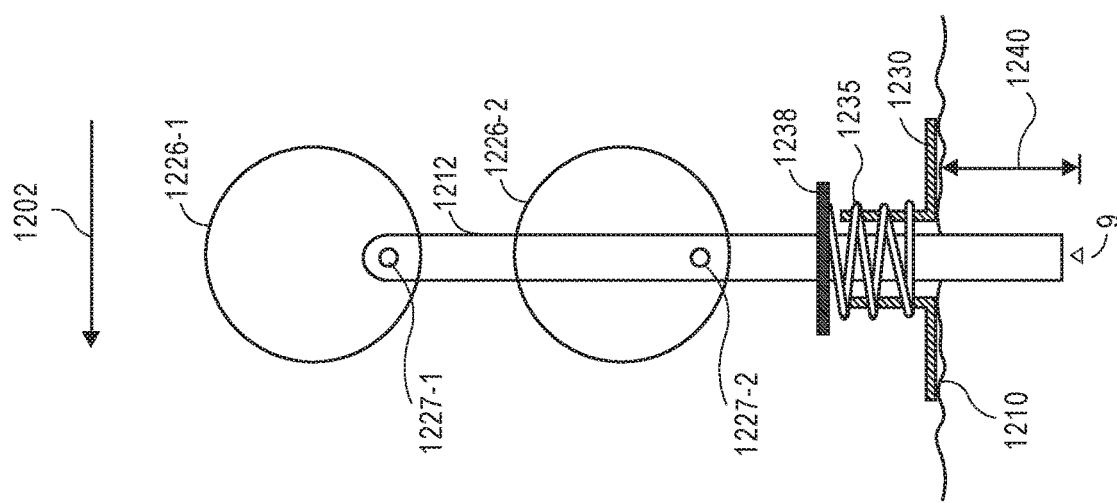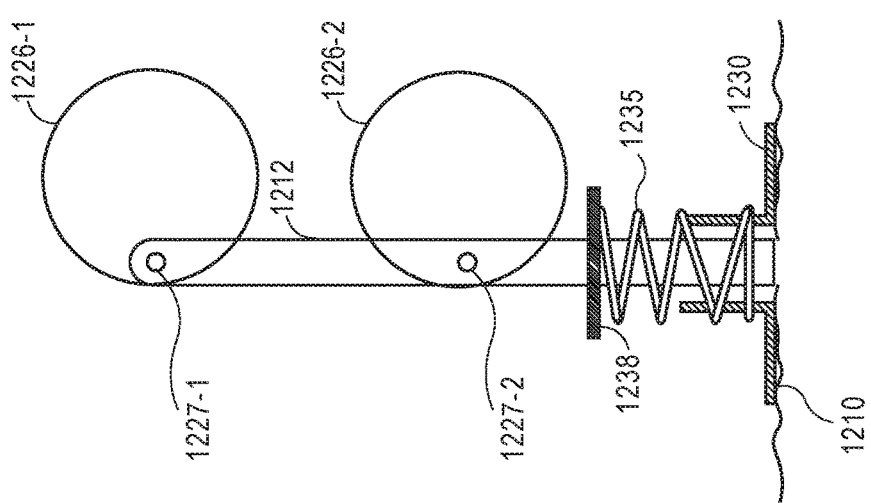

SEED INJECTOR

RELATED APPLICATIONS

This application is a divisional of U.S. patent application Ser. No. 16/629,886, which is a national phase entry under 35 U.S.C. § 371 of International Patent Application PCT/US2018/041371, filed Jul. 10, 2018, designating the United States of America and published in English as International Patent Publication WO 2019/014165 A1 on Jan. 17, 2019, which claims the benefit of the filing date of U.S. Provisional Application No. 62/530,754, filed on Jul. 10, 2017, titled "SEED INJECTOR," the entire disclosures of each of which are hereby incorporated by reference herein.

FIELD

This application is directed to an apparatus for planting seeds in soil.

BACKGROUND

Information about the technology generally. There are different machines for planting seeds based on the type of seeds. For row crop plants, such as corn and soybeans, the seeds are typically planted with a planter. A planter has a plurality of row units that each have a pair of opener discs for creating a seed trench. The row units contain a seed meter for singulating seeds and a tube for depositing the seeds into the seed furrow. Getting seeds to consistent depth can be challenging.

BRIEF SUMMARY

An apparatus for injecting seed into the ground is described herein.

BRIEF DESCRIPTION OF THE DRAWINGS

The present disclosure is illustrated by way of example, and not by way of limitation, in the figures of the accompanying drawings and in which:

FIG. 4 is a side elevation view of a shaft and holder according to one embodiment.

FIG. 5 is a side elevation view of a shaft and holder according to one embodiment.

FIG. 6 is a side elevation view of a shaft with a space for holding a seed according to one embodiment.

FIG. 7 is a side elevation view of a shaft with a fluid conduit according to one embodiment.

FIG. 8A is a top plain elevation view of a shaft and holder combination with wings with fluid conduits according to one embodiment.

FIG. 8B is a side elevation view of the shaft of FIG. 8A.

FIGS. 9A and 9B are side elevation views of a shaft and holder combination with a fluid conduit according to certain embodiments.

FIGS. 12A, 12B, and 12C illustrate different positions of a telescoping shaft with a biasing member in accordance with one embodiment.

DETAILED DESCRIPTION

All references cited herein are incorporated herein by reference in their entireties. If there is any conflict in definition between a definition in this specification and a definition in an incorporated reference, the definition in this specification shall control.

Provided is a seed injection system for penetrating the soil to deposit seeds in the soil. This can be done without creating a continuous seed trench. By not creating a continuous seed trench, a disc opener is not needed to create the trench. With an opener removed, rows can be placed closer together to increase the plant population per acre.

Also, the orientation of the seeds can be controlled. A preferred seed orientation is having the seed tip pointed down, or if on the side, the germ side is pointed up. With the seed tip down or the germ side up, the seed will sprout with the sprout pointed upwards. When placed in the furrow the opposite way, the sprout will initially be pointed down before moving to point upwards to emerge. This delay can cause late emergence in these seeds by several days. Consistent emergence is desired so that the plants grow at a consistent rate, use resources in the soil at the same time, and not have earlier emergers shade late emergers. Also, depth consistency can be controlled by controlling the depth that a shaft places seeds into the soil.

Figure 1:
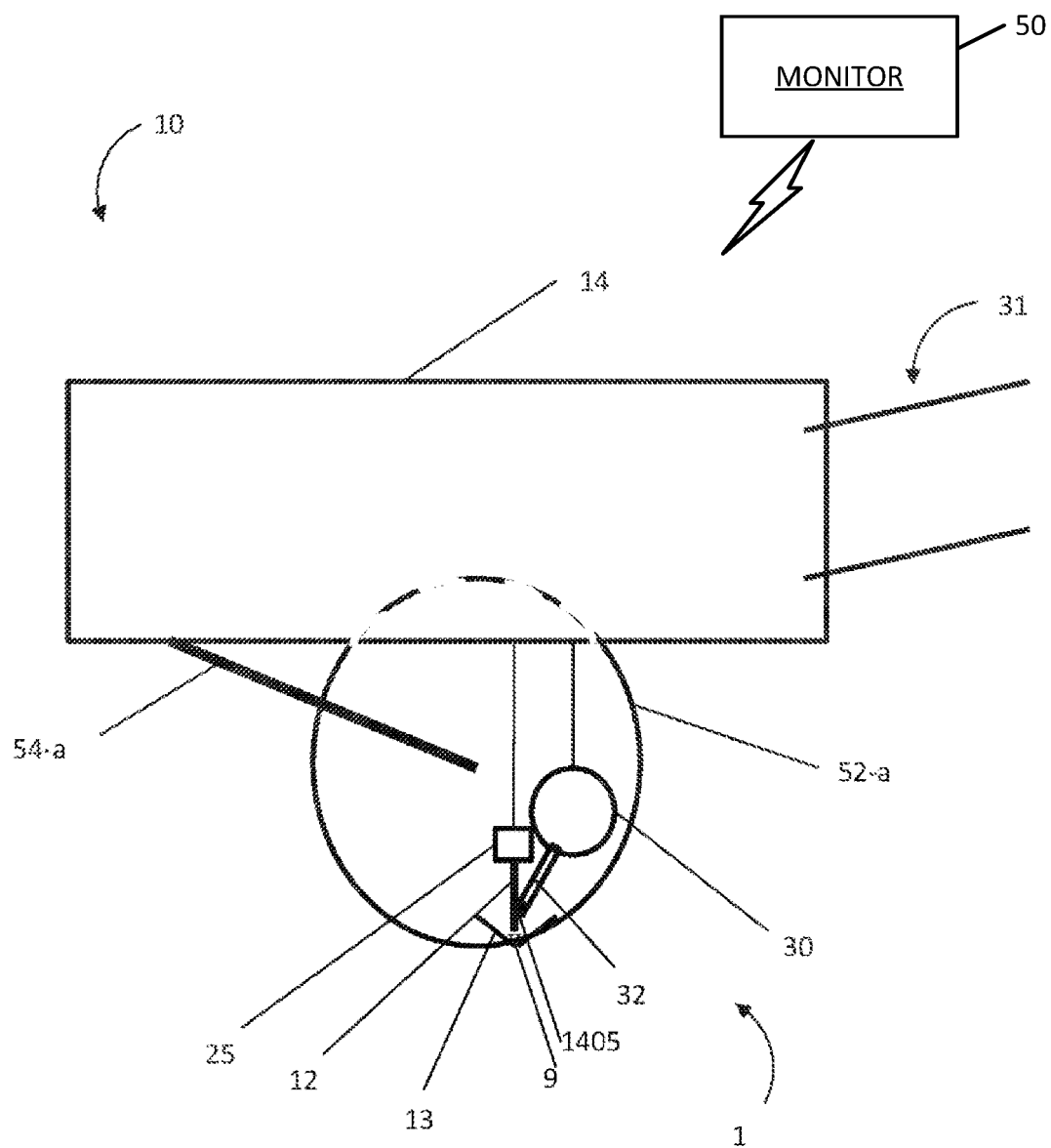
FIG. 1 is a side elevation view a row unit having a seed unit disposed on the row unit according to one embodiment.

FIG. 1 illustrates a row unit 10 having a seed unit 1 disposed on the row unit 10. Row unit 10 includes a frame 14 having a connection (such as parallel linkage 31) to an agricultural toolbar (not shown). Row unit 10 has gauge wheels 52-*b* and 52-*a* connected to frame 14 through gauge wheel arms 54-*b* and 54-*a*. Gauge wheel 52-*b* and gauge wheel arm 54-*b* are removed so that seed unit 1 can be viewed. Seed meter 30 is connected to row unit 14. A seed tube 32 is disposed to transfer seeds 9 from seed meter 30 to holder 13. A seed sensor 1405 is disposed in seed tube 32. Actuator 25 is connected to frame 14 and actuates shaft 12. While illustrated as being disposed between gauge wheels 52-*a*, 52-*b*, gauge wheels are not required.

Seed unit 1 includes a shaft 12 actuated by actuator 25. Shaft 12 pushes seeds into soil. Seeds 9 are singulated by a seed meter 30. Examples of seed meters can be found in International Patent Application Publications WO 2007/024646 A2, WO 2012/129442 A2, and WO 2016/077651 A1. Seeds 9 released from seed meter 30 enter seed tube 32 and are deposited in holder 13. Holder 13 can be made from a resilient material that expands under force and returns to its original shape when the force is removed. In one embodiment, holder 13 is similar to a duckbill valve in that it has a wider section for seed entry and a narrower section to prevent the seed from falling to the ground. In other embodiments, holder 13 has a conical shape, a cylindrical shape, or a combined cylinder portion and conical portion. Shaft 12 is extended to contact the seed 9 and push the seed 9 from holder 13 into the ground.

Actuator 25 can be any type of actuator to move shaft 12. Examples include, but are not limited to, linear actuator, hydraulic, electric, pneumatic, electro-hydraulic, and electro-pneumatic.

Actuator 25 and seed meter 30 are in signal communication with a monitor 50 (as described in International Patent Application Publication WO 2016/077651 A1). Monitor 50 of WO 2016/077651 A1 can send a signal to actuate actuator 25 based on timing of seed release from seed meter 30 and travel to holder 13 or based on sensing a seed 9 passing a seed sensor 1405 in seed tube 32 so that shaft 12 connects with seed 9 in holder 13.

Figure 2:
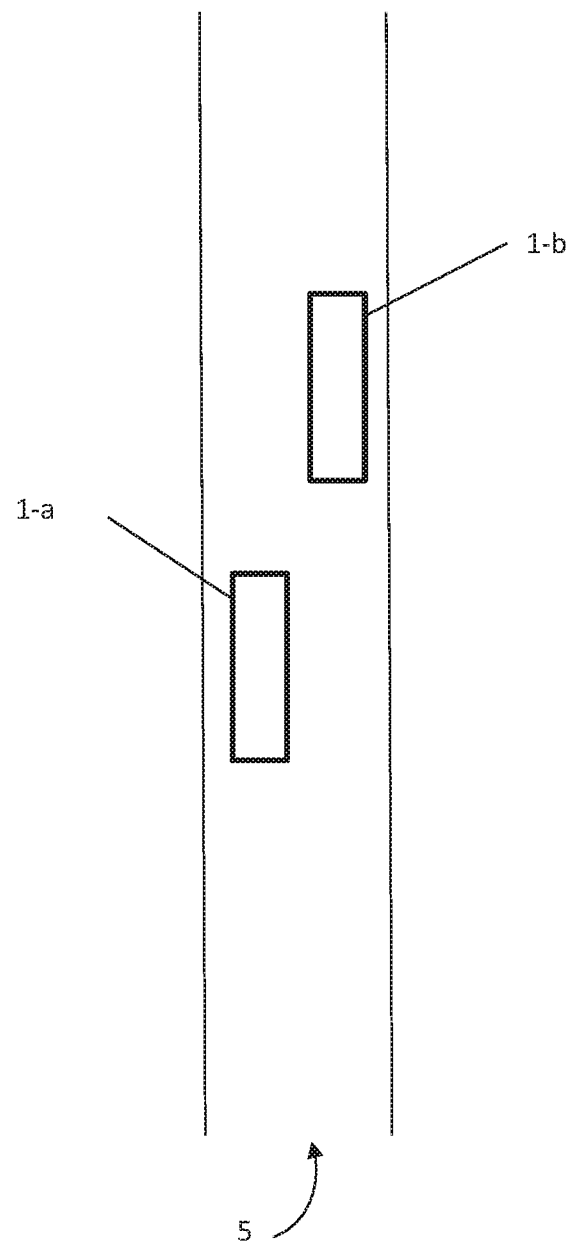
FIG. 2 is a top plain view of positioning of a plurality of seed units according to one embodiment.

In one embodiment illustrated in FIG. 2, seed unit 1 can comprise a plurality of seed units 1-a, 1-b or more per row. Seed units 1-a and 1-b can be positioned near or within a space for a traditional trench 5 (which is opened by opening discs) to increase the number of seed placements per distance travelled.

Figures 3A, 3B:
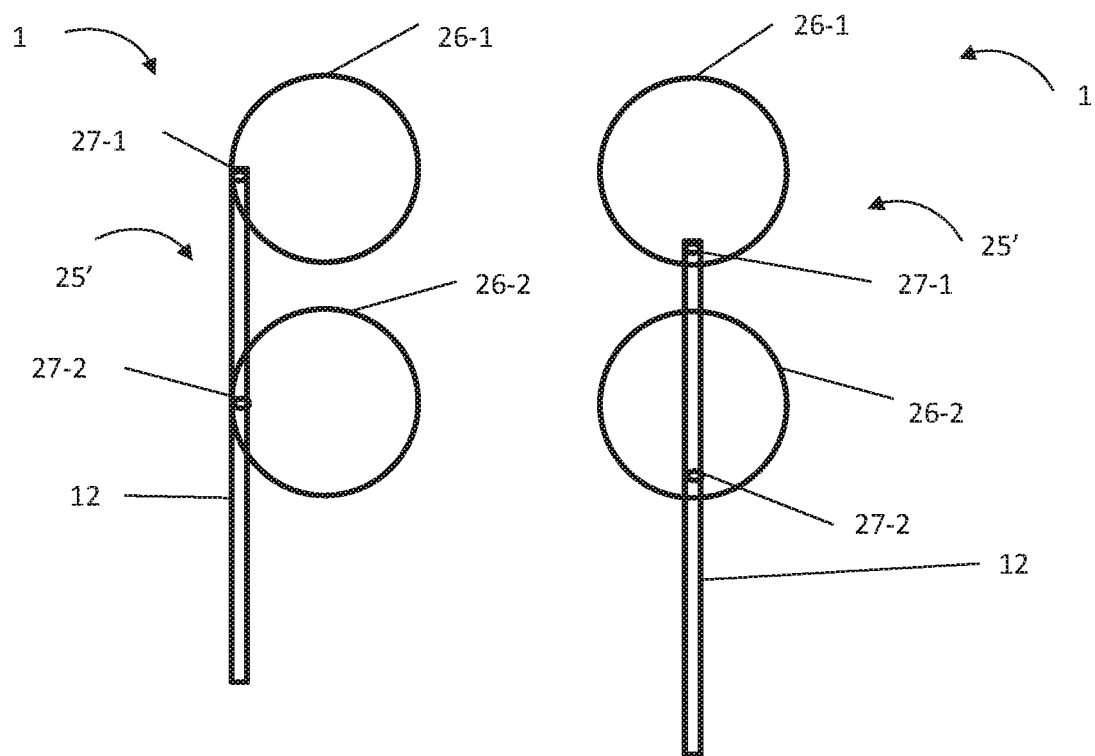
FIGS. 3A and 3B are side elevation views an actuator according to one embodiment and shown in two positions.

In one embodiment illustrated in FIGS. 3A and 3B, actuator 25 is illustrated as actuator 25'. Actuator 25' includes a first wheel 26-1 and a second wheel 26-2. Shaft 12 is connected to first wheel 26-1 via pivot 27-1, and shaft 12 is connected to second wheel 26-2 via pivot 27-2. As illustrated in FIGS. 3A and 3B, as wheels 26-1 and 26-2 rotate, the vertical position of shaft 12 changes.

Holder 13 can have different shapes. In FIG. 4, holder 13 is illustrated with a duckbill shape. Also, FIG. 4 illustrates having a seed with seed tip 11 oriented towards the soil. Having seed tip 11 oriented down, or having the seed embryo (not shown) oriented up, is a preferred orientation of seed 9 so that a sprouted seed is oriented to the surface of the soil. In another embodiment, uniform emergence (having sprouts emerge from soil at approximately the same time) can be achieved when seeds are all oriented the same way when placed in the ground. In FIG. 5, holder 13' has a cylindrical shape.

In another embodiment illustrated in FIG. 6, shaft 12 can be modified to shaft 12'''' to have a space 21 or recess at a distal end of shaft 12'''' for receiving a seed 9. This allows the forces for insertion of the seed into the soil to be carried by shaft 12''''. To eject seed 9 from space 21, a second shaft 20 is disposed within shaft 12''''''. Second shaft 20 is actuated by an actuator, such as any of the actuators 25 (not shown). When shaft 12'''' is inserted into the soil, monitor 50 actuates the actuator (not shown) to extend second shaft 20 to eject seed 9.

In other embodiments, fluid or solid delivery can also be provided. FIG. 7 illustrates shaft 12' having channel 17. Channel 17 is connected to a source (e.g., fluid source (not shown)). Fluids or solids including at least one of biologicals (e.g., inoculants, gene regulator), fertilizer, insecticide, or fungicide, can be deposited next to the seed. Solids can be delivered into soil as pellets.

FIGS. 8A and 8B illustrate shaft 12''. Shaft 12'' has one or more wings 16 (16-a, 16-b, 16-c, 16-d) for placing fluid in spaces near seed 9. Fluid conduits 17' (17'-a, 17'-b, 17'-c, and 17'-d). Fluid can be placed away from seed 9 and optionally lower than seed 9 in the soil. Instead of via the holder 13 (FIG. 1), seeds 9 are delivered to the ground through channel 15 in shaft 12'' after leaving seed tube 32 when shaft 12'' and seed tube 32 are aligned.

Figures 10A, 10B:
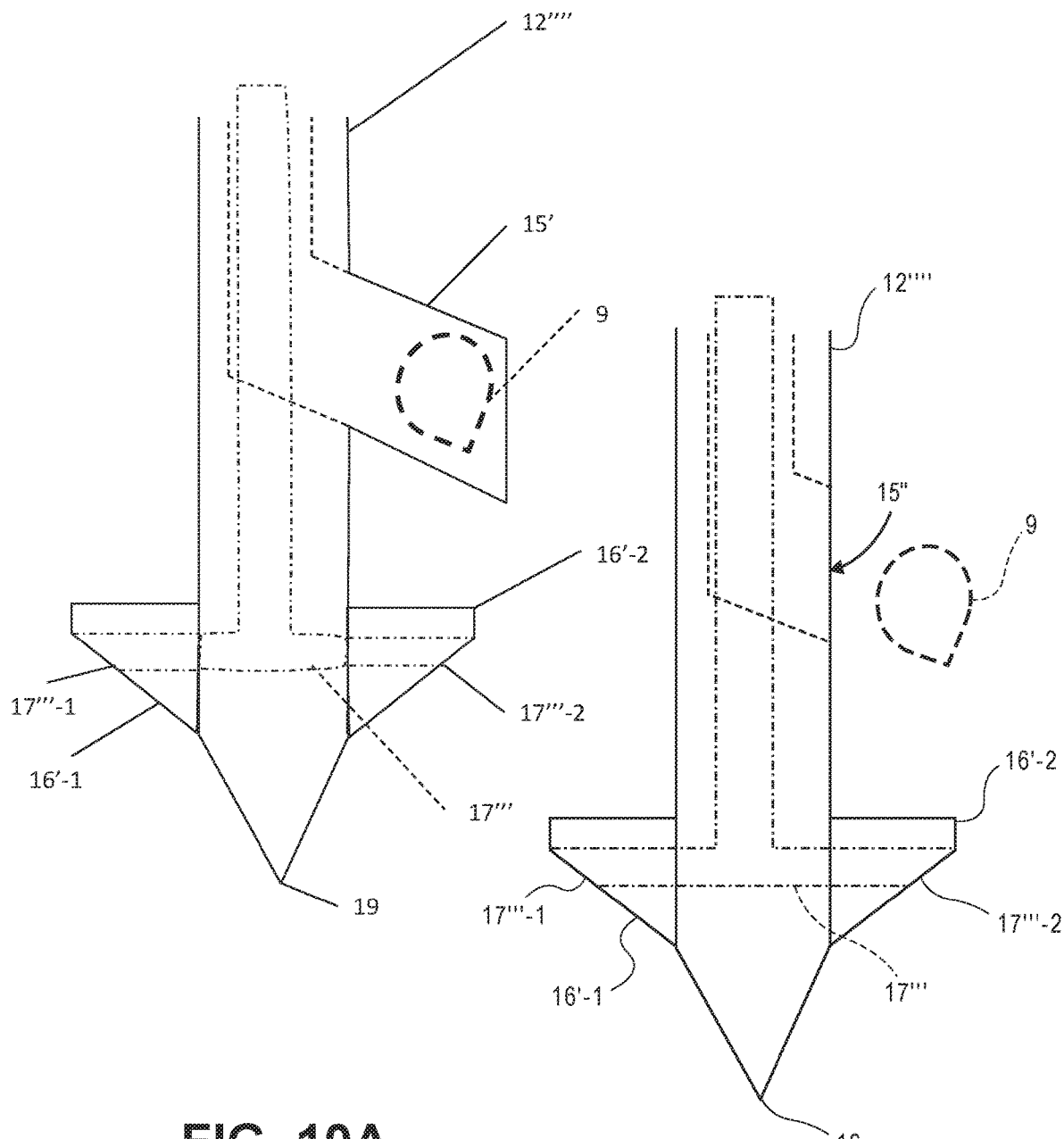
FIGS. 10A and 10B are side elevation views of a shaft and holder combination with a fluid conduit according to certain embodiments.

FIG. 9A illustrates a shaft 12''' that has a tip 19 for penetrating soil. Similar to FIG. 8B, shaft 12''' has a channel 15' that exits a side of shaft 12'''. Fluid conduit 17'' is disposed in shaft 12''' and exits shaft 12''' at one or more ports 18. FIG. 10A is a modification of FIG. 9A to have wings 16'-1 and 16'-2 with fluid conduit 17''' providing fluid to conduits 17'''-1 in wing 16'-1 and conduit 17'''-2 in wing 16'-2.

FIG. 9B illustrates a shaft 12''' that has a tip 19 for penetrating soil. Shaft 12''' has an opening 15'' that exits a side of shaft 12'''. Fluid conduit 17'' is disposed in shaft 12''' and exits shaft 12''' at one or more ports 18. FIG. 10B is a modification of FIG. 9B to have wings 16'-1 and 16'-2 with fluid conduit 17''' providing fluid to conduits 17'''-1 in wing 16'-1 and conduit 17'''-2 in wing 16'-2. Shaft 12''' has an opening 15'' that exits a side of shaft 12'''.

Figure 11A:
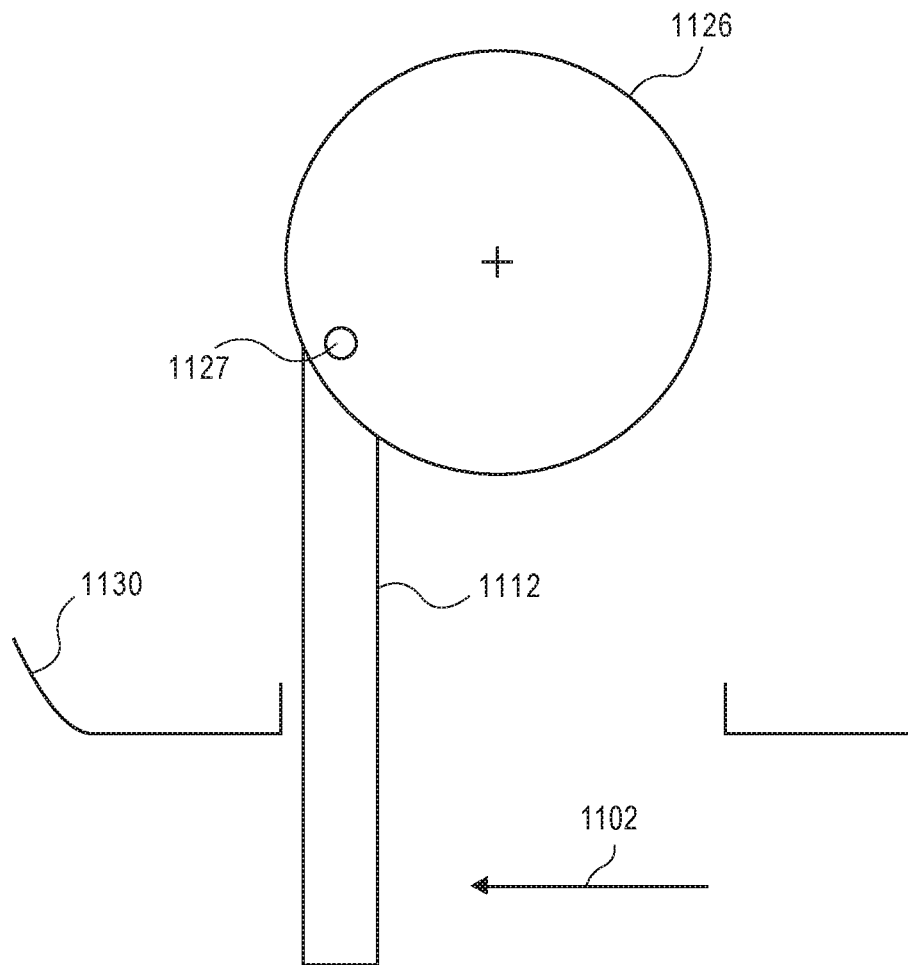
FIG. 11A illustrates a shaft with an actuator and plate member in accordance with one embodiment.
Figure 11B:
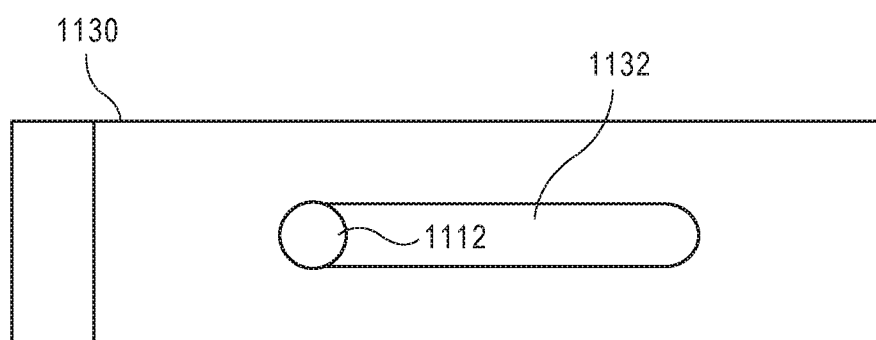
FIG. 11B illustrates a plate member 1130 having an opening 1132 to receiving the shaft 1112 in accordance with one embodiment.

FIG. 11A illustrates a shaft with an actuator and plate member for delivering seeds, fluids, and solid material in accordance with one embodiment. Actuator 1126 includes a wheel. Shaft 1112 is connected to the wheel via pivot 1127. A vertical position of shaft 1112 changes as the wheel of actuator 1126 rotates. A plate member 1130 can be coupled (e.g., laterally fixed) to the shaft 1112, frame 14, gauge wheel, or any component of the row unit 10. FIG. 11B illustrates a plate member 1130 having an opening 1132 for receiving the shaft 1112. The plate member 1130 during operation of the row unit prevents soil from being deposited onto different components of the row unit, which has a direction of travel 1102.

FIGS. 12A, 12B, and 12C illustrate different positions of a telescoping shaft with a biasing member (e.g., spring) for delivering seeds, fluids, and solid material in accordance with one embodiment. Actuators 1226-1 and 1126-2 are connected to the shaft 1212 via pivots 1227-1 and 1127-2. A vertical position of shaft 1212 changes as the actuators rotate. A plate member 1238 can be coupled to the shaft 1212, frame 14, gauge wheel, or any component of the row unit 10. A plate member 1230 or feet 1230 are coupled to the plate member 1238 with a biasing member 1235. The plate member 1230 or feet 1230 set the depth of planting seeds. The plate member 1230 or feet 1230 during operation of the row unit reduces or eliminates soil disturbance and/or prevents soil from being deposited onto different components of the row unit, which has a direction of travel 1202. FIG. 12A illustrates a first position of the shaft with the shaft being above a ground surface 1210. FIG. 12B illustrates a second position of the shaft with the shaft penetrating a ground surface 1210 with a depth 1240 to deliver seeds 9, fluid, or solid material. FIG. 12C illustrates a third position of the shaft with the shaft being above the ground surface 1210.

Figure 13:
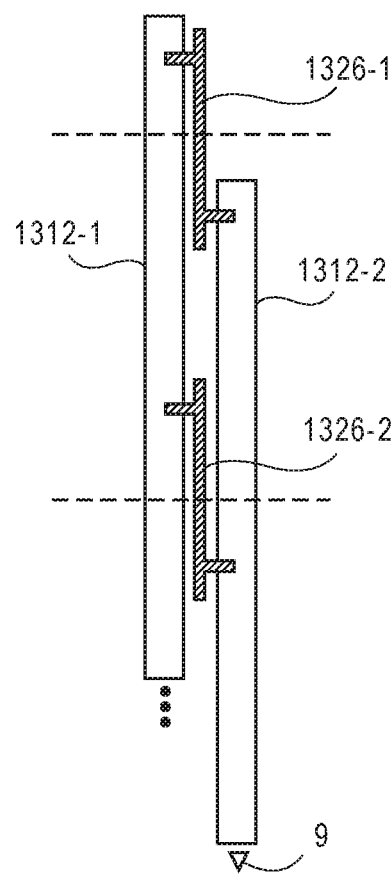
FIG. 13 illustrates multiple shafts with actuators for delivering seeds, fluids, and solid material in accordance with one embodiment.

FIG. 13 illustrates multiple shafts with actuators for delivering seeds, fluids, and solid material in accordance with one embodiment. The actuator 1326-1 and 1326-2 actuate to cause movement of the shafts 1312-1 and 1312-2 for delivering seeds, fluids, and solid material. In one example, the shaft 1312-1 delivers fluid to soil and the shaft 1312-2 delivers seeds 9 to the soil.

Figure 14:
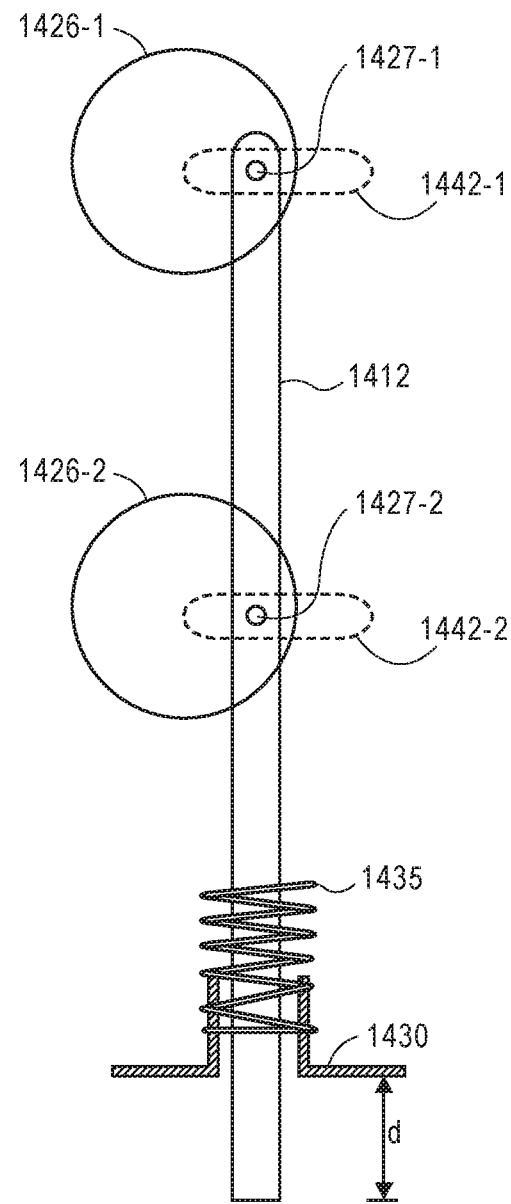
FIG. 14 illustrates different positions of a telescoping shaft with a biasing member in accordance with one embodiment.

FIG. 14 illustrates different positions of a telescoping shaft with a biasing member for delivering seeds, fluids, and solid material in accordance with one embodiment. Actuators 1426-1 and 1426-2 are connected to the shaft 1412 via pivots 1427-1 and 1427-2. A vertical position of shaft 1412 changes as the actuators rotate. A radius of an actuator changes by horizontally sliding the shaft with a pin within regions 1442-1 and 1442-2. A radius of the actuator correlates with a seeding rate. Drive speed of the tractor and implement also correlates with seeding rate.

A plate member 1430 and biasing member 1435 can be coupled to the shaft 1412, frame 14, gauge wheel, or any component of the row unit 10. The plate member 1430 or feet during operation of the row unit prevents soil from being deposited onto different components of the row unit. The plate member 1430 can be positioned near a ground surface and a distal end of the shaft 1412 has a depth d for controlling a planting depth in soil.

Figure 15:
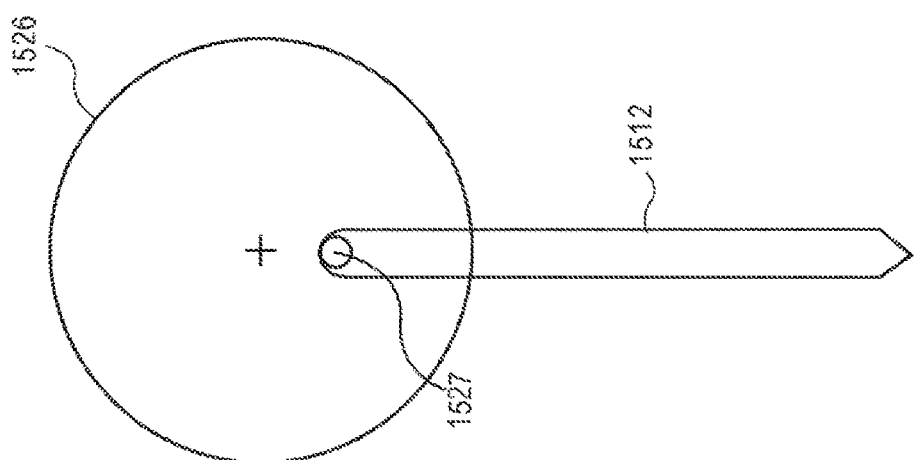
FIG. 15 illustrates a shaft with an actuator in accordance with one embodiment.

FIG. 15 illustrates a shaft with an actuator for delivering seeds, fluids, and solid material in accordance with one embodiment. Actuator 1526 includes a wheel. Shaft 1512 is connected to the wheel via pivot 1527. A vertical position of shaft 1512 changes as the wheel of actuator 1526 rotates.

Figure 16:
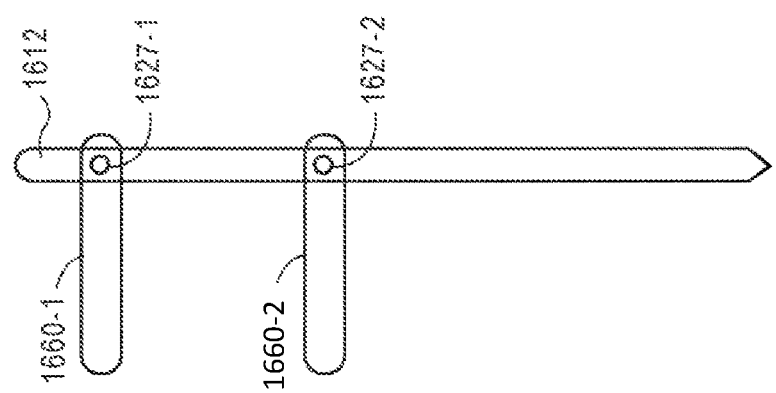
FIG. 16 illustrates a shaft with arms in accordance with one embodiment.

FIG. 16 illustrates a shaft with arms for delivering seeds, fluid, and solid material into soil in accordance with one embodiment. Shaft 1612 is connected to the arms 1660-1 and 1660-2 via pivots 1627-1 and 1627-2. A vertical position of shaft 1612 changes as the arms rotate.

In one embodiment, a shaft delivers seeds into the soil without a continuous seed trench to improve control of seed to seed spacing (e.g., 1" spacing for soybean seeds, 8" spacing for corn seeds) within a row. The shaft may include a channel to improve fluid delivery with reduced fluid consumption compared to seed and fluid delivery with a continuous seed trench. The shaft provides improved control of fluid to seed spacing without contacting the seed. The intermittent or discontinuous soil openings (e.g., openings slightly large than a seed size, half inch openings, etc.) that are caused by the shaft also provide less disturbance of soil in comparison to a continuous trench.

In one example, seed is positioned in a shaft and then delivered into soil. In another example, seeds pass through a channel in a shaft into an opening in the soil. The seed can be air blown through the channel into the soil.

A seed planting unit provides seeding rate control based on adjusting a radius of a wheel of the actuator or adjusting a drive speed.

Figure 17:
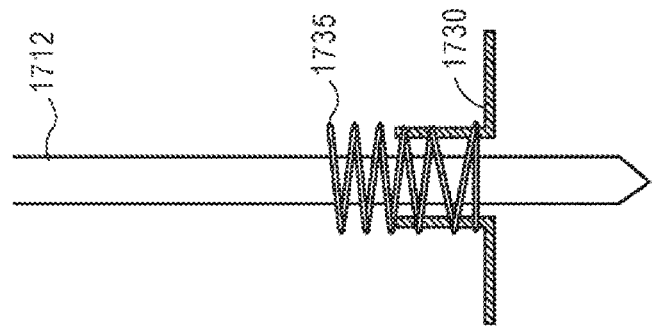
FIG. 17 illustrates a telescoping shaft having a biasing member in accordance with one embodiment.

FIG. 17 illustrates a telescoping shaft 1712 (e.g., of a seed unit robot) having a biasing member for delivering seeds, fluids, and solid material in accordance with one embodiment. A vertical position of shaft 1712 changes as an actuating mechanism of the robot actuates. A plate member 1730 can be coupled to the shaft 1712, frame 14, gauge wheel, or any component of the row unit 10. A plate member 1730 or feet are biased with a biasing member 1735. The plate member 1730 or feet during operation of the robot prevents soil from being deposited onto different components of the row unit. The robot may be a seed unit (e.g., seed unit 1, self-guided device, self-propelled device, drone, etc.) that operates independently without being coupled to a tractor. The robot can be stationary when delivering seed, fluid, or solid materials through the shaft 1712 into the soil. The robot can include one or more row units for delivering seeds, fluid, and solid material to soil.

What is claimed is:

1. A seed planting unit, comprising:
   a seed meter for singulating seeds;
   a shaft defining a space or recess for receiving a seed from the seed meter at a first end of the shaft and at least one wing at a second end of the shaft, the shaft and the wing defining at least one fluid conduit through the shaft and the wing, wherein the shaft is configured to deliver the seeds and a fluid to soil without a continuous seed trench;
   a wheel configured to rotate in a vertical plane parallel to a forward travel direction of the seed planting unit, wherein shaft is connected to the wheel via a pivot so that, as the wheel rotates, the shaft moves vertically with respect to the soil to cause the second end of the shaft to penetrate the soil.

2. The seed planting unit of claim 1, wherein the shaft defines a tip at the second end of the shaft, the tip having a narrowing cross-section.

3. The seed planting unit of claim 1, wherein the at least one fluid conduit has an exit in the at least one wing.

4. The seed planting unit of claim 1, wherein the at least one wing has a cross-section greater than a cross-section of the first end of the shaft.

5. The seed planting unit of claim 1, wherein the shaft is configured to control a depth of seeds being delivered into the soil and to control seed-to-seed spacing.

6. The seed planting unit of claim 1, further comprising a second wheel configured to rotate in the vertical plane, wherein the shaft is connected to second wheel via a second pivot.

* * * * *